(12) United States Patent
Liang et al.

(10) Patent No.: US 12,509,398 B2
(45) Date of Patent: Dec. 30, 2025

(54) *PAENIBACILLUS MUCILAGINOSUS*, MICROORGANISM-ACTIVATED CIRCULATING FLUIDIZED BED (CFB) FLY ASH-BASED CEMENTITIOUS MATERIAL, PREPARATION METHOD AND USE

(71) Applicant: Taiyuan University of Technology, Taiyuan (CN)

(72) Inventors: Haixia Liang, Taiyuan (CN); Baohua Tian, Taiyuan (CN); Yunqi Liu, Taiyuan (CN); Yu Li, Taiyuan (CN); Limin Zhai, Taiyuan (CN)

(73) Assignee: Taiyuan University of Technology, Taiyuan (CN)

( * ) Notice: Subject to any disclaimer, the term of this patent is extended or adjusted under 35 U.S.C. 154(b) by 727 days.

(21) Appl. No.: 17/825,182

(22) Filed: May 26, 2022

(65) Prior Publication Data
US 2023/0406772 A1   Dec. 21, 2023

(51) Int. Cl.
| | |
|---|---|
| *C04B 28/02* | (2006.01) |
| *C04B 24/04* | (2006.01) |
| *C04B 103/00* | (2006.01) |
| *C12N 1/20* | (2006.01) |
| *C12R 1/07* | (2006.01) |

(52) U.S. Cl.
CPC ............ *C04B 28/021* (2013.01); *C04B 24/04* (2013.01); *C12N 1/205* (2021.05); *C04B 2103/0001* (2013.01); *C12R 2001/07* (2021.05)

(58) Field of Classification Search
CPC .................. C04B 28/021; C04B 24/04; C04B 2103/0001; C12N 1/205; C12R 2001/07
See application file for complete search history.

(56) References Cited

FOREIGN PATENT DOCUMENTS

| | | | | |
|---|---|---|---|---|
| CN | 112877234 A | * | 6/2021 | ............ C04B 12/00 |
| CN | 112979193 A | * | 6/2021 | ............ C04B 20/023 |

OTHER PUBLICATIONS

Zhan, Loose Sand Cemented by Microbial Cementitious Material: Composition, Microstructure and Mechanical Properties. J. Wuhan Univ. Technol.-Mat. Sci., published Jan. 20, 2022, vol. 37, p. 714-719 (Year: 2022).*
Hu, Transfer of Bacillus mucilaginosus and Bacillus edaphicus to the genus *Paenibacillus* as *Paenibacillus mucilaginosus* comb. nov. and *Paenibacillus edaphicus* comb. nov, Int J Syst Evol Microbiol, Published Jan. 2010, e-published Jul. 30, 2009, vol. 60, p. 8-14 (Year: 2009).*
Zhang, Circulating Fluidized Bed Fly Ash Mixed Functional Cementitious Materials: Shrinkage Compensation of f-CaO, Autoclaved Hydration Characteristics and Environmental Performance, Materials (Basel), published Oct. 12, 2021, vol. 14, No. 20 (Year: 2021).*
Fan, Use of mixed solid waste as a soil amendment for saline-sodic soil remediation and oat seedling growth improvement, Environ Sci Pollut Res, e-published Aug. 9, 2016, vol. 23, No. 21, p. 21407-21415 (Year: 2016).*
Wulandari, Modification of fly ash using acids and alkali by hydrothermal method and its application as adsorbents material for phosphate adsorption in aquatic system, IOP Conf. Ser.: Mater. Sci. Eng., published 2020, No. 902, DOI: 10.1088/1757-899X/902/1/012034 (Year: 2020).*
Wang, Waste vinegar residue as substrate for phytase production, Waste Management & Research, published Dec. 2011, vol. 29, No. 12, p. 1262-1270 (Year: 2011).*
Madadi, Characterization of Calcium Silicate Hydrate Gels with Different Calcium to Silica Ratios and Polymer Modifications, Gels, published Jan. 24, 2022, vol. 8, No. 75 (Year: 2022).*
Wang, Adsorption properties of CFBC ash-cement pastes as compared with PCC fly ash-cement pastes, Int J Coal Sci Technol, e-published Jan. 27, 2016, vol. 3, No. 1, p. 62-67 (Year: 2016).*
Liu, The bio-activation of pozzolanic activity of circulating fluidized-bed fly ash by Paenibacillus mucilaginosus, Advanced Powder Technology, Published Aug. 2022, vol. 33, No. 8 (Year: 2022).*
Li, Paenibacillus mucilaginosus LT1906 exopolysaccharide-based composite aerogel for flexible strain sensor, Polymer, Published Dec. 2022, vol. 263 (Year: 2022).*
Wang, Synergistic effects of Paenibacillus mucilaginosus and Penicillium pimiteouiense on the extraction of humic substances from lignite, Process Biochemistry, published Nov. 2024, p. 347-354 (Year: 2024).*

* cited by examiner

*Primary Examiner* — David Steadman
*Assistant Examiner* — Scott E. Mulder
(74) *Attorney, Agent, or Firm* — Singleton Law, PLLC; Chainey P. Singleton

(57) ABSTRACT

The present disclosure provides a *Paenibacillus mucilaginosus* LT1906 and use thereof, and a microorganism-activated circulating fluidized bed (CFB) fly ash-based cementitious material and a preparation method and use thereof, belonging to the technical field of cementitious materials. The *Paenibacillus mucilaginosus* LT1906 has a deposit number of CGMCC No. 21337. The strain is capable of dissolving silicate minerals and aluminosilicate minerals in the CFB fly ash to increase dissolution of active $SiO_2$. The strain is used for activating the CFB fly ash-based cementitious material, to ameliorate a large water demand and a low early strength of the cementitious material, thereby improving comprehensive utilization of the CFB fly ash in the field of building materials.

5 Claims, 3 Drawing Sheets

PAENIBACILLUS MUCILAGINOSUS, MICROORGANISM-ACTIVATED CIRCULATING FLUIDIZED BED (CFB) FLY ASH-BASED CEMENTITIOUS MATERIAL, PREPARATION METHOD AND USE

TECHNICAL FIELD

The present disclosure belongs to the technical field of cementitious materials, and in particular relates to a *Paenibacillus mucilaginosus* LT1906 and a culture method and use thereof, and a microorganism-activated circulating fluidized bed (CFB) fly ash-based cementitious material and a preparation method and use thereof.

BACKGROUND ART

Circulating fluidized bed (CFB) fly ash is solid sulfur fly ash produced by adding limestone to a furnace for desulfurization to control $SO_2$ emission during combustion of inferior coal in thermal power plants. Due to a potential pozzolanic activity and self-hardening, the CFB fly ash can be used as an auxiliary cementitious material for cement and concrete. However, due to a loose and porous surface, high calcium-sulfur content, and great loss on ignition, the CFB fly ash as the auxiliary cementitious material for the cement and concrete has a large water demand, low early strength, and high late expansion rate. These factors seriously restrict comprehensive utilization of the CFB fly ash in the field of building materials. Therefore, it is urgent to develop an activation technology capable of effectively improving an activity of the CFB fly ash, thereby effectively ameliorating the large water demand and the low early strength of the CFB fly ash as a cementitious material.

SUMMARY

To solve the above problems, the present disclosure provides a *Paenibacillus mucilaginosus* LT1906 and a culture method and use thereof, and a microorganism-activated CFB fly ash-based cementitious material and a preparation method and use thereof. The *Paenibacillus mucilaginosus* is used to activate an activity of the CFB fly ash, which effectively ameliorates a large water demand and a low early strength of the CFB fly ash as a cementitious material, thereby improving comprehensive utilization of the CFB fly ash in the field of building materials.

To achieve the above objective, the present disclosure provides the following technical solutions.

The present disclosure provides a *Paenibacillus mucilaginosus* LT1906, with a deposit number of CGMCC No. 21337.

The present disclosure further provides a culture method of the *Paenibacillus mucilaginosus* LT1906, including the following steps: inoculating the *Paenibacillus mucilaginosus* LT1906 into a seed medium for seed culture to obtain a *Paenibacillus mucilaginosus* seed liquid; and inoculating the *Paenibacillus mucilaginosus* seed liquid into a fermentation medium for fermentation culture to obtain a *Paenibacillus mucilaginosus* LT1906 bacterial solution; where the seed medium has a pH value of 7.0 to 7.5, and includes the following components in mass concentrations: 5 g/L to 10 g/L sucrose, 0.1 g/L to 0.2 g/L $K_2HPO_4$, 0.1 g/L to 0.2 g/L $MgSO_4 \cdot 7H_2O$, 0.002 g/L to 0.005 g/L $FeCl_3$, 0.2 g/L to 0.5 g/L $CaCO_3$, and 0.2 g/L to 0.5 g/L $(NH_4)_2SO_4$; and the seed culture is conducted at 30° C. to 35° C. and 160 rpm to 200 rpm for 24 h to 48 h; and the fermentation medium has a pH value of 7.0 to 7.5, and includes the following components in mass concentrations: 5 g/L to 10 g/L sucrose, 0.1 g/L to 0.2 g/L $K_2HPO_4$, 0.1 g/L to 0.2 g/L $MgSO_4 \cdot 7H_2O$, 0.002 g/L to 0.005 g/L $FeCl_3$, and 0.2 g/L to 0.5 g/L $CaCO_3$; and the fermentation culture has an inoculation quantity of 5% to 10%, and is conducted at 30° C. to 32° C. and 160 rpm to 200 rpm for 24 h to 60 h.

The present disclosure further provides use of the *Paenibacillus mucilaginosus* LT1906 in activating CFB fly ash.

The present disclosure further provides a microorganism-activated CFB fly ash-based cementitious material, including the following raw materials: CFB fly ash, a bacterial solution of the *Paenibacillus mucilaginosus* LT1906, and a vinegar residue leachate. Preferably, the CFB fly ash, the bacterial solution of the *Paenibacillus mucilaginosus* LT1906, and the vinegar residue leachate may have a mass ratio of 100:(9-27):(18-36).

Preferably, the CFB fly ash may be a solid waste generated by burning coal in a CFB boiler, may include the following components in mass percentages: $SiO_2 \geq 35\%$, f-CaO≤4%, and $SO_3 \leq 3\%$, and may have a specific surface area of 330 $m^2$/kg to 400 $m^2$/kg and a 80 μm sieve residue of 15% to 20%.

Preferably, the bacterial solution of the *Paenibacillus mucilaginosus* LT1906 may have a cell concentration of $10^6$ cells/mL to $10^7$ cells/mL and a viscosity of 2 mPa·s to 15 mPa·s.

Preferably, a preparation method of the vinegar residue leachate may include the following steps: mixing water with a fresh vinegar residue in a mass ratio (800-1000):1, allowing to stand at 4° C. to 10° C. for 24 h to 36 h, and removing a solid vinegar residue by filtration to obtain the vinegar residue leachate.

The present disclosure further provides a preparation method of the microorganism-activated CFB fly ash-based cementitious material, including the following steps: mixing the CFB fly ash, the bacterial solution of the *Paenibacillus mucilaginosus* LT1906, and the vinegar residue leachate to obtain the microorganism-activated CFB fly ash-based cementitious material.

The present disclosure further provides use of the microorganism-activated CFB fly ash-based cementitious material or a microorganism-activated CFB fly ash-based cementitious material prepared by the preparation method in the field of building materials.

Beneficial effects are as follows:

The present disclosure provides the *Paenibacillus mucilaginosus* LT1906, with the deposit number of CGMCC No. 21337. The *Paenibacillus mucilaginosus* LT1906 can dissolve silicate minerals and aluminosilicate minerals in the CFB fly ash, to increase a content of active $SiO_2$, which is beneficial to accelerate the formation of hydrated calcium silicate gel (C—S—H), thereby improving a gelation strength. The *Paenibacillus mucilaginosus* can also destroy a II-$CaSO_4$ crystal form on a surface of the CFB fly ash, such that a hydration product dihydrate gypsum is reduced to relieve later expansion. The *Paenibacillus mucilaginosus* can also secrete a large amount of extracellular mucopolysaccharide, which is combined with free water failed to react effectively through hydrogen bonds. A combined product has the functions of water reduction and retardation, thereby reducing the water demand of CFB fly ash and improving the rheological properties of slurry. The *Paenibacillus mucilaginosus* LT1906 can be used to activate modification of the CFB fly ash, which ameliorates the large water demand and the low early strength of the CFB fly ash as a cementitious material, thereby improving comprehensive utilization of the CFB fly ash in the field of building materials.

DESCRIPTION OF THE BIOLOGICAL PRESERVATION

The *Paenibacillus mucilaginosus* LT1906 was deposited in the China General Microbial Culture Collection Center (CGMCC) at NO. 1 West Beichen Road, Chaoyang District, Beijing 100101, China on Dec. 9, 2020, with a deposit number of CGMCC No. 21337.

A deposit of the biological material identified in the present application has been made under the provisions of the Budapest Treaty on the International Recognition of the Deposit of Microorganisms for the Purposes of Patent Procedure with the China General Microbial Culture Collection Center (CGMCC), NO. 1 West Beichen Road, Chaoyang District, Beijing, China. The deposit was made on Dec. 9, 2020, and was accepted and assigned Accession No. CGMCC No. 21337. The deposited biological material will be made available to the public irrevocably and without restriction or condition upon the issuance of a patent, in accordance with the requirements of 37 C.F.R. §§ 1.801-1.809 and the provisions of the Budapest Treaty. The biological material deposit is considered to be part of the disclosure of this application and is intended to satisfy the requirements of 35 U.S.C. § 112 with respect to enablement. The availability of the deposited material does not constitute a license to practice the invention in contravention of the rights granted under any patent issuing from this application. If the deposit should be replaced or supplemented, such replacement or supplementation will be made in accordance with 37 C.F.R. § 1.805, and all relevant statements of availability and accession information will be updated accordingly. The date of the viability test was Dec. 9, 2020. The procedures used to obtain a sample if the test is not done by the depository were to collect the rhizosphere soil from a rice paddy of Jinci, Taiyuan, China and, and enrich bacteria in nitrogen-containing silicate medium, purify the clonies on nitrogen-free high-carbon solid medium, screen strains with silicate-solubilizing activity, and identify the strain with 16S rDNA sequencing. The deposit is capable of reproduction. The biological material is known and readily available to the public and all restrictions in the access will be irrevocably removed by the Applicant upon granting of the patent, the data supporting the claimed element is attached in the file named "Translation of Deposit".

DETAILED DESCRIPTION OF THE EMBODIMENTS

Figure 1:
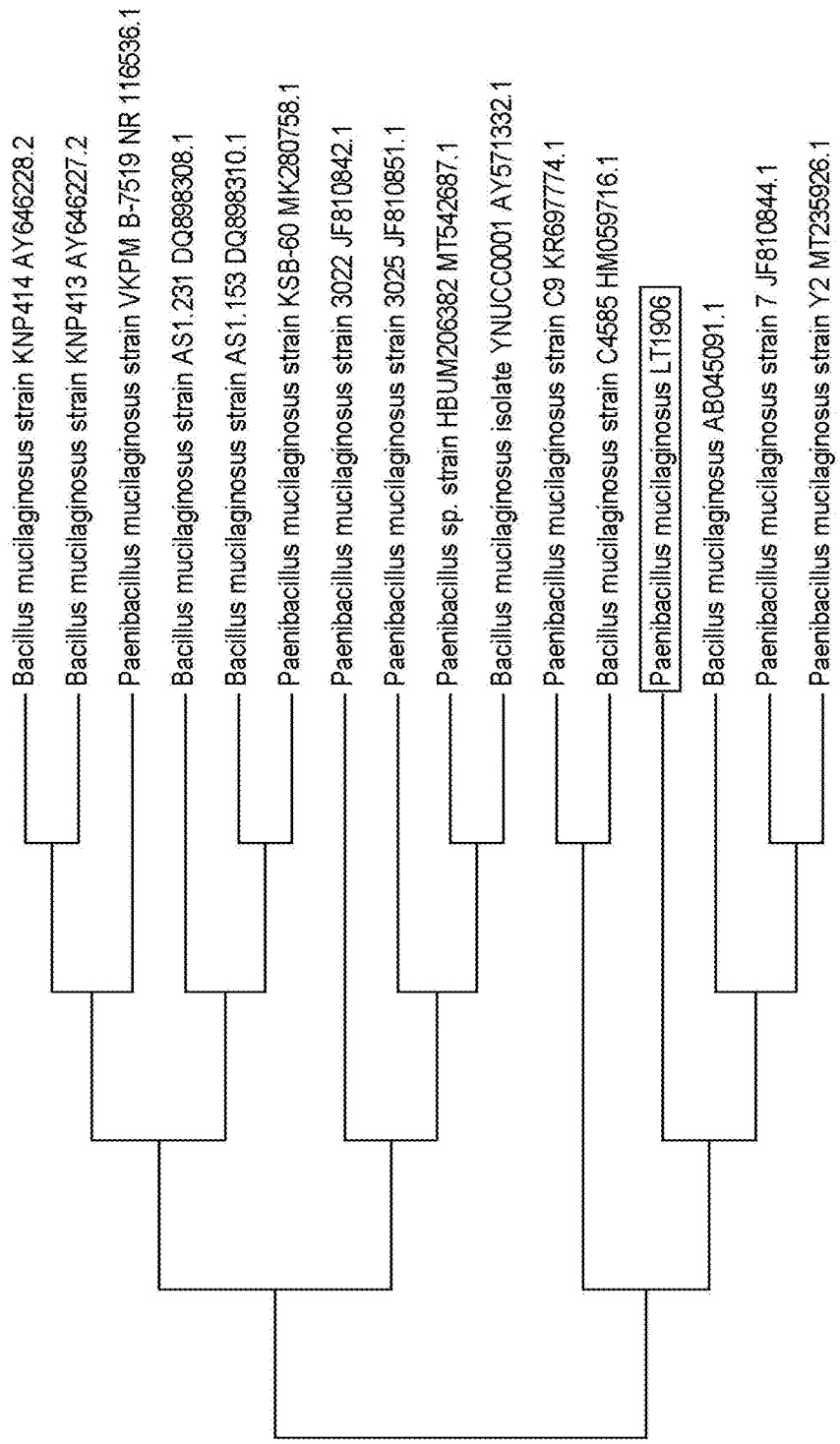
FIG. 1 shows a phylogenetic tree of a *Paenibacillus mucilaginosus* LT1906 of the present disclosure.

The present disclosure provides a *Paenibacillus mucilaginosus* LT1906, with a deposit number of CGMCC No. 21337. The *Paenibacillus mucilaginosus* LT1906 has glass bead-like, colorless, transparent, moist and shiny colonies, with smooth surface, neat edges, sticky and elastic colloids, which can be drawn into filaments when being picked up. A 16S rDNA sequence of the *Paenibacillus mucilaginosus* is compared with a published 16S rDNA sequence in GenBank using BLAST software, and it is found that a sequence similarity with 15 strains of *Bacillus* and *Paenibacillus* is greater than 99%. A phylogenetic tree is shown in FIG. 1. The *Paenibacillus mucilaginosus* LT1906 can dissolve silicate minerals and aluminosilicate minerals in the CFB fly ash, to increase a content of active $SiO_2$, which is beneficial to accelerate the formation of C—S—H, thereby improving gelation strength. The *Paenibacillus mucilaginosus* can also destroy a II-$CaSO_4$ crystal form on a surface of the CFB fly ash, the solubility of $CaSO_4$ increases gradually, while insoluble $CaSO_4$ decreases, such that a hydration product dihydrate gypsum is reduced to relieve later expansion. The *Paenibacillus mucilaginosus* can also secrete a large amount of extracellular mucopolysaccharide, which is combined with free water failed to react effectively through hydrogen bonds. A combined product has the functions of water reduction and retardation, thereby reducing the water demand of CFB fly ash and improving the rheological properties of slurry to improve workability and subsequent machinability. Therefore, the *Paenibacillus mucilaginosus* LT1906 can be used to modify the CFB fly ash, which ameliorates the large water demand and the low early strength of the CFB fly ash as a cementitious material, thereby improving comprehensive utilization of the CFB fly ash in the field of building materials.

The present disclosure further provides a culture method of the *Paenibacillus mucilaginosus* LT1906, including the following steps: inoculating the *Paenibacillus mucilaginosus* LT1906 into a seed medium for seed culture to obtain a *Paenibacillus mucilaginosus* seed liquid; and inoculating the *Paenibacillus mucilaginosus* seed liquid into a fermentation medium for fermentation culture to obtain a *Paenibacillus mucilaginosus* LT1906 bacterial solution. The seed medium includes the following components in mass concentrations preferably: 5 g/L to 10 g/L sucrose, 0.1 g/L to 0.2 g/L $K_2HPO_4$, 0.1 g/L to 0.2 g/L $MgSO_4 \cdot 7H_2O$, 0.002 g/L to 0.005 g/L $FeCl_3$, 0.2 g/L to 0.5 g/L $CaCO_3$, and 0.2 g/L to 0.5 g/L $(NH_4)_2SO_4$; more preferably 5 g/L sucrose, 0.1 g/L $K_2HPO_4$, 0.1 g/L $MgSO_4 \cdot 7H_2O$, 0.002 g/L $FeCl_3$, 0.2 g/L $CaCO_3$, and 0.2 g/L $(NH_4)_2SO_4$. The seed medium has a pH value of preferably 7.0 to 7.5, more preferably 7.2. The formulation of the medium provides optimum nutrient conditions for mass propagation of the strain to promote rapid propagation of the strain to obtain the bacterial solution. The seed culture is conducted at preferably 30° C. to 35° C., more preferably 30° C. and preferably 160 rpm to 200 rpm, more preferably 180 rpm for preferably 24 h to 48 h, more preferably 36 h. Under specific seed culture conditions, the strain reaches a maximum concentration in a minimum culture time, there greatly shortening a culture time of the strain. The *Paenibacillus mucilaginosus* seed liquid is inoculated into the fermentation medium by 5% to 10%, more preferably 10% of an inoculation quantity to conduct the fermentation culture; the specific inoculation quantity balances bacterial concentration and exopolysaccharide production. The fermentation medium includes the following components in mass concentrations preferably: 5 g/L to 10 g/L sucrose, 0.1 g/L to 0.2 g/L $K_2HPO_4$, 0.1 g/L to 0.2 g/L $MgSO_4 \cdot 7H_2O$, 0.002 g/L to 0.005 g/L $FeCl_3$, and 0.2 g/L to 0.5 g/L $CaCO_3$; more preferably 5 g/L sucrose, 0.1 g/L $K_2HPO_4$, 0.1 g/L $MgSO_4 \cdot 7H_2O$, 0.002 g/L $FeCl_3$, 0.2 g/L $CaCO_3$. The fermentation medium has a pH value of preferably 7.0 to 7.5, more preferably 7.2. The fermentation medium can promote exopolysaccharide production of the strain, as an optimal nutritional condition for the exopolysaccharide production of the strain. The fermentation culture is conducted at preferably 30° C. to 32° C., more preferably 30° C. and preferably 180 rpm to 200 rpm, more preferably 180 rpm for preferably 24 h to 60 h, more preferably 36 h. Under specific fermentation culture conditions, the strain reaches a maximum exopolysaccharide concentration in a minimum culture time, there shortening a fermentation time of the strain.

The present disclosure further provides use of the *Paenibacillus mucilaginosus* LT1906 in activating CFB fly ash. The *Paenibacillus mucilaginosus* ameliorates the large water demand and the low early strength of the CFB fly ash as a cementitious material, thereby improving comprehensive utilization of the CFB fly ash in the field of building materials (such as pipeline and roadbed engineering backfill operations, and coal mine goaf backfill treatment).

The present disclosure further provides a microorganism-activated CFB fly ash-based cementitious material, including the following raw materials: CFB fly ash, a bacterial solution of the *Paenibacillus mucilaginosus* LT1906, and a vinegar residue leachate. The microorganism-activated CFB fly ash-based cementitious material has a specific surface area of 600 m$^2$/kg to 720 m$^2$/kg, more preferably 645 m$^2$/kg to 680 m$^2$/kg, and an activity index of greater than or equal to 60%, more preferably 65%. The microorganism-activated CFB fly ash-based cementitious material has significantly improved specific surface area and activity index after being activated by microorganisms; a higher specific surface area leads to a higher surface energy, resulting in a higher hydration reaction activity, and the hydration reaction is easier to conduct to generate a large amount of hydration products, thereby improving the density and the strength activity index of hardened slurry.

In the present disclosure, the CFB fly ash, the bacterial solution of the *Paenibacillus mucilaginosus* LT1906, and the vinegar residue leachate have a mass ratio of preferably 100:(9-27):(18-36), more preferably 100:(9-18):(27-36), and further more preferably 100:9:36; by further limiting a dosage relationship of the bacterial solution, the vinegar residue leachate and the fly ash, a dissolution ratio of Ca$^{2+}$ and Si is optimized, such that an optimum reaction concentration is provided for the hydration reaction.

In the present disclosure, the CFB fly ash is a solid waste generated by burning coal in a CFB boiler, includes the following components in mass percentages preferably: SiO$_2$≥35%, f-CaO≤4%, and SO$_3$≤3%, more preferably SiO$_2$ 41.5%, f-CaO 3%, and SO$_3$ 2%, and has a specific surface area of 330 m$^2$/kg to 400 m$^2$/kg, more preferably 400 m$^2$/kg and the 80 μm sieve residue of 15% to 20%, more preferably 15%.

In the present disclosure, the bacterial solution of the *Paenibacillus mucilaginosus* LT1906 has a cell concentration of preferably 10$^6$ cells/mL to 10$^7$ cells/mL, more preferably 2×10$^6$ cells/mL and a viscosity of preferably 2 mPa·s to 15 mPa·s, more preferably 6 mPa s. The bacterial solution includes preferably the bacterial solution of the *Paenibacillus mucilaginosus* LT1906 obtained by the culture method. The specific concentration and viscosity of the bacterial solution are selected to ensure a content of capsules in the bacterial solution; a main component in the capsule is extracellular polymers, which are a necessary condition for bacterial cells to adhere to a mineral surface to form a complex, promoting the degradation of fly ash, and improving the dissolution of active components such as active silicon.

In the present disclosure, a preparation method of the vinegar residue leachate includes preferably the following steps: mixing water with a fresh vinegar residue in a mass ratio (800-1000):1, allowing to stand at 4° C. to 10° C. for 24 h to 36 h, and removing a solid vinegar residue by filtration to obtain the vinegar residue leachate. The specific leaching ratio and conditions can dissolve out the most acetic acid. The water and the fresh vinegar residue have a mass ratio of (800-1000):1, more preferably 1000:1, such that the acetic acid can be fully dissolved out; the standing is conducted at 4° C. to 10° C., more preferably 8° C. for 24 h to 26 h, more preferably 24 h. The vinegar residue leachate has a total acid content of preferably greater than or equal to 6%, more preferably 8.9%, and an acetic acid content of greater than or equal to 5%, more preferably 6.5%. The vinegar residue leachate can improve a dissolution rate of Ca$^{2+}$, provide more hydration reactants Ca$^{2+}$ to react with the *Paenibacillus mucilaginosus*, thus accelerating the formation of C—S—H gel, and improving the early self-gelling strength; meanwhile, the vinegar residue leachate makes full use of the vinegar residue waste to recycle the vinegar residue, which reduces a production cost and reduces environmental pollution caused by the vinegar residue waste.

The microorganism-activated CFB fly ash-based cementitious material ameliorates the large water demand and the low early strength of the CFB fly ash as a cementitious material, and fully activates a potential pozzolanic activity and self-gelling properties of the material, thereby improving comprehensive utilization of the CFB fly ash in the field of building materials.

The present disclosure further provides a preparation method of the microorganism-activated CFB fly ash-based cementitious material, including the following steps: mixing the CFB fly ash, the bacterial solution of the *Paenibacillus mucilaginosus* LT1906, and the vinegar residue leachate to obtain the microorganism-activated CFB fly ash-based cementitious material. The preparation method of the microorganism-activated CFB fly ash-based cementitious material has a simple process and low energy consumption, and does not produce secondary pollution, and the prepared microorganism-activated CFB fly ash-based cementitious material ameliorates the large water demand and the low early strength of the CFB fly ash as a cementitious material.

The present disclosure further provides use of the microorganism-activated CFB fly ash-based cementitious material or a microorganism-activated CFB fly ash-based cementitious material prepared by the preparation method in the field of building materials. The field of building materials is preferably a low-strength cementitious filling material. The low-strength cementitious filling material includes preferably use in pipeline and roadbed engineering backfill operations, and coal mine goaf backfill treatment.

In order to further illustrate the present disclosure, the *Paenibacillus mucilaginosus* LT1906 and the culture method and the use thereof, and the microorganism-activated CFB fly ash-based cementitious material and the preparation method and the use thereof provided in the present disclosure are described in detail below with reference to examples, but these examples should not be interpreted as a limitation to the protection scope of the present disclosure.

Example 1

Microorganism-Activated CFB Fly Ash-Based Cementitious Material

1. Obtaining a bacterial solution of a *Paenibacillus mucilaginosus* LT1906
   (1) A single colony of *Paenibacillus mucilaginosus* was inoculated into a seed medium for seed culture, where the *Paenibacillus mucilaginosus* was the *Paenibacillus mucilaginosus* LT1906 of the present disclosure, with a deposit number of CGMCC No. 21337; the seed medium included the following components in concentrations: 5 g/L sucrose, 0.1 g/L $K_2HPO_4$, 0.1 g/L $MgSO_4$ $7H_2O$, 0.002 g/L $FeCl_3$, 0.2 g/L $CaCO_3$ and 0.2 g/L $(NH_4)_2SO_4$, and had a pH value of 7.2; and shake culture was conducted at 30° C. for 36 h to obtain a *Paenibacillus mucilaginosus* seed liquid.
   (2) The *Paenibacillus mucilaginosus* seed liquid was inoculated to a fermentation medium at an inoculation quantity of 10%, where the fermentation medium included the following components in concentrations: 5 g/L sucrose, 0.1 g/L $K_2HPO_4$, 0.1 g/L $MgSO_4$ $7H_2O$, 0.002 g/L $FeCl_3$ and 0.2 g/L $CaCO_3$, and had a pH value of 7.2; shake culture was conducted at 30° C. for 36 h until a cell concentration was $2\times10^6$ cells/mL and a viscosity was 6 mPa·s, to obtain a *Paenibacillus mucilaginosus* LT1906 bacterial solution.
2. Water was mixed with a fresh vinegar residue in a mass ratio of 1000:1 evenly, allowed to stand at 8° C. for 24 h, and filtered to remove a solid vinegar residue to obtain a vinegar residue leachate, where the vinegar residue leachate had a total acid content of 8.9%, and an acetic acid content of 6.5%.
3. CFB fly ash, the *Paenibacillus mucilaginosus* LT1906 bacterial solution and the vinegar residue leachate were mixed in a mass ratio of 100:9:36, where the CFB fly ash included 41.5% of $SiO_2$, 3% of f-CaO, and 2% of $SO_3$, and had a specific surface area of 400 $m^2$/kg and a 80 μm sieve residue of 15%. After mixing, the microorganism-activated CFB fly ash-based cementitious material was prepared.

Example 2

A microorganism-activated CFB fly ash-based cementitious material was prepared by a preparation method the same as that of Example 1, the difference was: CFB fly ash, a *Paenibacillus mucilaginosus* LT1906 bacterial solution and a vinegar residue leachate had a mass ratio of 100:18:27.

Example 3

A microorganism-activated CFB fly ash-based cementitious material was prepared by a preparation method the same as that of Example 1, the difference was: seed culture was conducted for 48 h, fermentation culture was conducted for 24 h, a cell concentration was $5\times10^6$ cells/mL, a viscosity was 12 mPa s.

Example 4

A microorganism-activated CFB fly ash-based cementitious material was prepared by a preparation method the same as that of Example 1, the difference was: CFB fly ash, a *Paenibacillus mucilaginosus* LT1906 bacterial solution and a vinegar residue leachate had a mass ratio of 100:9:20.

Example 5

A microorganism-activated CFB fly ash-based cementitious material was prepared by a preparation method the same as that of Example 1, the difference was: water was mixed with a fresh vinegar residue in a mass ratio of 800:1 evenly, allowed to stand at 8° C. for 36 h, and filtered to remove a solid vinegar residue to obtain a vinegar residue leachate, where the vinegar residue leachate had a total acid content of 8.2%, and an acetic acid content of 5.65%.

Comparative Example 1

A microorganism-activated CFB fly ash-based cementitious material was prepared by a preparation method the same as that of Example 1, the difference was: a *Paenibacillus mucilaginosus* LT1906 was replaced with a *Paenibacillus mucilaginosus* AS1.232 (purchased from Shanghai Huzheng Biotechnology Co., Ltd.).

Comparative Example 2

A microorganism-activated CFB fly ash-based cementitious material was prepared by a preparation method the same as that of Example 1, the difference was: CFB fly ash was treated with only a *Paenibacillus mucilaginosus* LT1906 bacterial solution, where the CFB fly ash and the *Paenibacillus mucilaginosus* LT1906 bacterial solution had a mass ratio of 100:9.

Comparative Example 3

A microorganism-activated CFB fly ash-based cementitious material was prepared by a preparation method the same as that of Example 1, the difference was: CFB fly ash was treated with only a vinegar residue leachate, where the CFB fly ash and the vinegar residue leachate had a mass ratio of 100:36.

Comparative Example 4

A microorganism-activated CFB fly ash-based cementitious material was prepared by a preparation method the same as that of Example 1, the difference was: a vinegar residue leachate was replaced with an aqueous solution of acetic acid at a concentration of 5% by volume.

Comparative Example 5

A CFB fly ash-based cementitious material was prepared by a preparation method the same as that of Example 1, the difference was: a *Paenibacillus mucilaginosus* LT1906 bacterial solution and a vinegar residue leachate were replaced with water.

Comparative Example 6

An alkali-activated CFB fly ash-based cementitious material was prepared by a preparation method the same as that of Example 1, the difference was: a *Paenibacillus mucilaginosus* LT1906 bacterial solution and a vinegar residue leachate were replaced with a NaOH aqueous solution, with a final concentration of NaOH of 2 M.

Example 6

The different cementitious materials obtained in Examples 1 to 5 and Comparative Examples 1 to 4, untreated CFB fly ash and I to III grades of fly ash were compared for the performance of cement mortar, and water demand, 28-d activity index and specific surface area of different cementitious materials were investigated. The test results were shown in Table 1.

Water demand: fluidity of a comparative mortar (250 g of cement, 750 g of standard sand, and 125 ml of water) and a test mortar (175 g of cement, X g of different cementitious materials obtained in the examples and comparative examples or 75 g of untreated CFB fly ash/I to III grades of fly ash, and 750 g of standard sand) was measured according to GB/T2419, and the water demand for fly ash was determined by a ratio of an amount of water added when the fluidity of the test mortar reached 130 mm to 140 mm to that of the comparative mortar of 125 mL. The calculation methods for the amount of different cementitious materials obtained in the above examples and comparative examples in the test mortar were as follows: in Examples 1, 3 and 5, X=75 g*(9+36+100)/100; in Example 2, X=75 g*(18+27+100)/100; in Example 4, X=75 g*(9+20+100)/100; for the amount of water added to the test mortar, total amount of water added=(bacterial solution mass−bacterial dry weight−medium component mass)+(vinegar residue leachate mass−total acid mass)+actual water added in water demand test.

Activity index: 28-d compressive strength of a comparative mortar (450 g of cement, 1,350 g of standard sand, and 225 ml of water) and a test mortar (315 g of cement, X g of different cementitious materials obtained in the examples and comparative examples or 135 g of untreated CFB fly ash/I to III grades of fly ash, 1,350 g of standard sand, and 225 ml of water) was measured according to a test method of GB/T17671-1999, and the activity index of the test mortar was determined by a ratio of the two compressive strengths. The calculation methods for the amount of different cementitious materials obtained in the above examples and comparative examples in the test mortar were as follows: in Examples 1, 3 and 5, X=135 g*(9+36+100)/100; in Example 2, X=135 g*(18+27+100)/100; in Example 4, X=135 g*(9+20+100)/100; for the different cementitious materials obtained in the examples and comparative examples in the test mortar, in the activity index test, actual mass of water added=225 ml*1 g/mL−(bacterial solution dosage−bacteria dry weight−medium component mass)−(vinegar residue leachate mass−total acid mass).

TABLE 1

Results of testing properties of cement mortar with different cementitious materials

|  | Water demand ratio | 28-d activity index | Specific surface area |
|---|---|---|---|
| Cementitious material of Example 1 | 105% | 69% | 600 m²/kg |
| Cementitious material of Example 2 | 102% | 71% | 630 m²/kg |
| Cementitious material of Example 3 | 102% | 73% | 635 m²/kg |
| Cementitious material of Example 4 | 107% | 65% | 610 m²/kg |
| Cementitious material of Example 5 | 103% | 72% | 615 m²/kg |
| Grade I fly ash | ≤95% | 75% | 400-1200 m²/kg |
| Grade II fly ash | ≤105% | 70% | 400-1200 m²/kg |
| Grade III fly ash | ≤115% | 62% | 400-1200 m²/kg |
| Untreated CFB fly ash | 135% | 52% | 400 m²/kg |
| Cementitious material of Comparative Example 1 | 131% | 55% | 428 m²/kg |
| Cementitious material of Comparative Example 2 | 127% | 56% | 432 m²/kg |
| Cementitious material of Comparative Example 3 | 132% | 51% | 400 m²/kg |
| Cementitious material of Comparative Example 4 | 128% | 57% | 412 m²/kg |

From the results in Table 1, it can be seen that the specific surface area, water demand ratio and 28-d activity index of the cementitious material of the present disclosure are slightly different from those of I to III grades of fly ash, but are significantly better than the control and untreated CFB fly ash, showing desirable application effect. After the CFB fly ash is modified by *Paenibacillus mucilaginosus* LT1906 according to the method of the present disclosure, the particle morphology and pore structure are significantly improved, and adverse effects in water demand and workability are eliminated to a certain extent.

Figure 2:
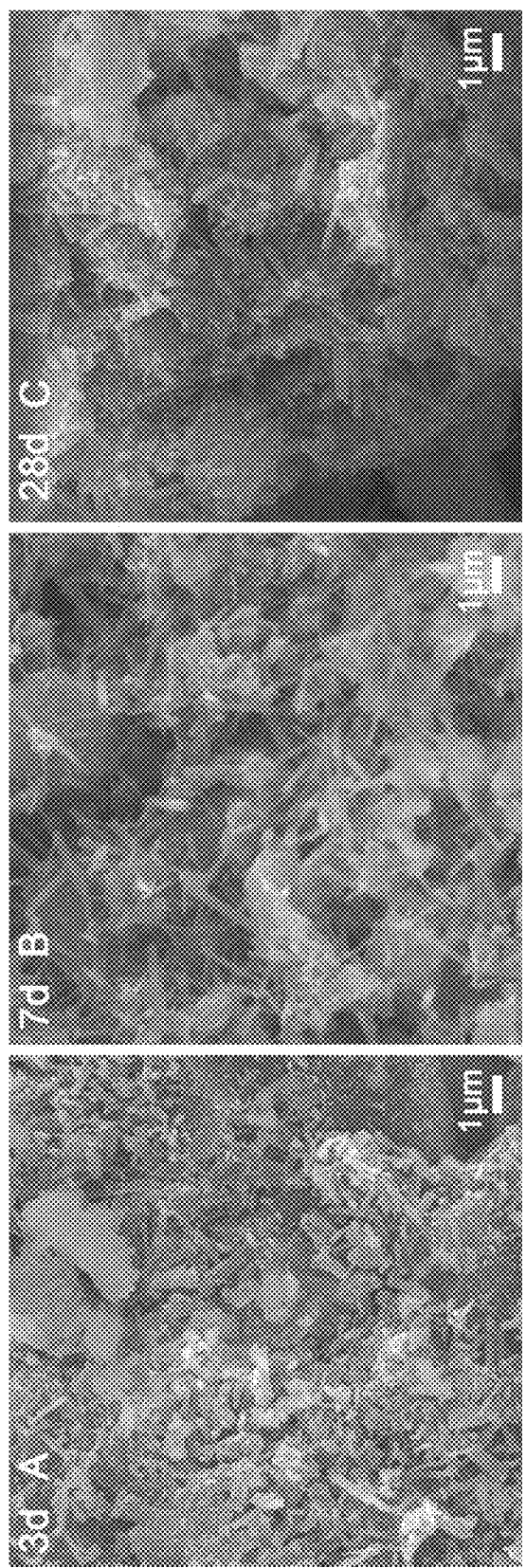
FIG. 2 shows scanning electron microscope (SEM) images of hydration products at different ages of silt soil stabilized by a cementitious material of Example 1 in Example 4, where A is a 3-d age, B is a 7-d age, and C is a 28-d age.

The different cementitious materials obtained in Examples 1 to 5 and Comparative Examples 1 to 4, untreated CFB fly ash and I to III grades of fly ash were used to stabilize the silt soil, where 200 g of the silt soil, 145 g of untreated CFB fly ash/I to III grades of fly ash or X g of the different cementitious materials obtained in the examples and comparative examples were mixed with 10 g of water, and filled into a 40*40*40 mm mold for vibration molding with standard curing, and the strengths of silt soil after 3 d, 7 d and 28 d of stabilization were investigated in each treatment group. The calculation methods for the amount of different cementitious materials obtained in the above examples and comparative examples were as follows: in Examples 1, 3 and 5, X=145 g*(9+36+100)/100; in Example 2, X=145 g*(18+27+100)/100; in Example 4, X=145 g*(9+20+100)/100; for the different cementitious materials obtained in the examples and comparative examples, actual mass of water added=10 g−(bacterial solution mass−bacteria dry weight−medium component mass)−(vinegar residue leachate mass−total acid mass). The test results are shown in Table 2; and FIG. 2 shows SEM images of hydration products at different ages of silt soil stabilized by the cementitious material of Example 1.

TABLE 2

Strength results of silt soil stabilized by different treatment groups

|  | 3-d strength | 7-d strength | 28-d strength |
|---|---|---|---|
| Cementitious material of Example 1 | 5.3 MPa | 9.8 MPa | 23 MPa |
| Cementitious material of Example 2 | 5.8 MPa | 12.3 MPa | 36 MPa |
| Cementitious material of Example 3 | 6.1 MPa | 10.3 MPa | 39 MPa |
| Cementitious material of Example 4 | 4.8 MPa | 9.6 MPa | 26 MPa |
| Cementitious material of Example 5 | 5.1 MPa | 9.2 MPa | 32 MPa |
| Untreated CFB fly ash | 0.98 MPa | 1.3 MPa | 3.2 MPa |
| Cementitious material of Comparative Example 1 | 1.2 MPa | 1.3 MPa | 3.5 MPa |
| Cementitious material of Comparative Example 2 | 2.5 MPa | 3.3 MPa | 5.2 MPa |
| Cementitious material of Comparative Example 3 | 0.88 MPa | 1.02 MPa | 2.8 MPa |
| Cementitious material of Comparative Example 4 | 0.92 MPa | 1.23 MPa | 2.6 MPa |

It can be seen from the results in Table 2 that the compressive strength of the silt soil after the early stabilization of the cementitious materials of the examples in the present disclosure is significantly increased; and the compressive strength of the silt soil increases with the prolongation of hydration age. The reason is that, on the one hand, the active silica-alumina component dissolved in the bacterial solution gradually increases; on the other hand, the bacterial liquid acts on the fly ash to gradually increase the specific surface area, thereby enhancing the hydration reaction activity, generating more hydration products, and making the structure more compact.

FIG. 2 shows SEM images of hydration products at different ages of silt soil stabilized by a cementitious material of Example 1, where A is a 3-d age, B is a 7-d age, and C is a 28-d age. It can be seen from the results in FIG. 2 that at the 3-d age, needle-shaped ettringite and flocculent C—S—H are formed, and there are large gaps between the hydration products; at the 7-d age, with the progress of hydration reaction, a large amount of ettringite and C—S—H are formed, and the hydration products were relatively tightly connected; at the 28-d age, the needle-shaped ettringite and flocculent C—S—H have significantly increased gelation and more compact connection, and are cemented each other to form a three-dimensional network structure. This shows that with the prolongation of age, the degree of hydration and the degree of crystallization of hydration products are increasingly high, the crystal particles are obviously larger, and the strength of filler is also enhanced accordingly.

Example 7

XRD scanning (with a Haoyuan DX-2700BH multifunctional diffractometer) was conducted on the microorganism-activated CFB fly ash-based cementitious materials and untreated CFB fly ash obtained in Example 1 and Comparative Example 5, to analyze an effect of different treatments on a crystal structure of the CFB fly ash material. The test results are shown in FIG. 3.

Figure 3:
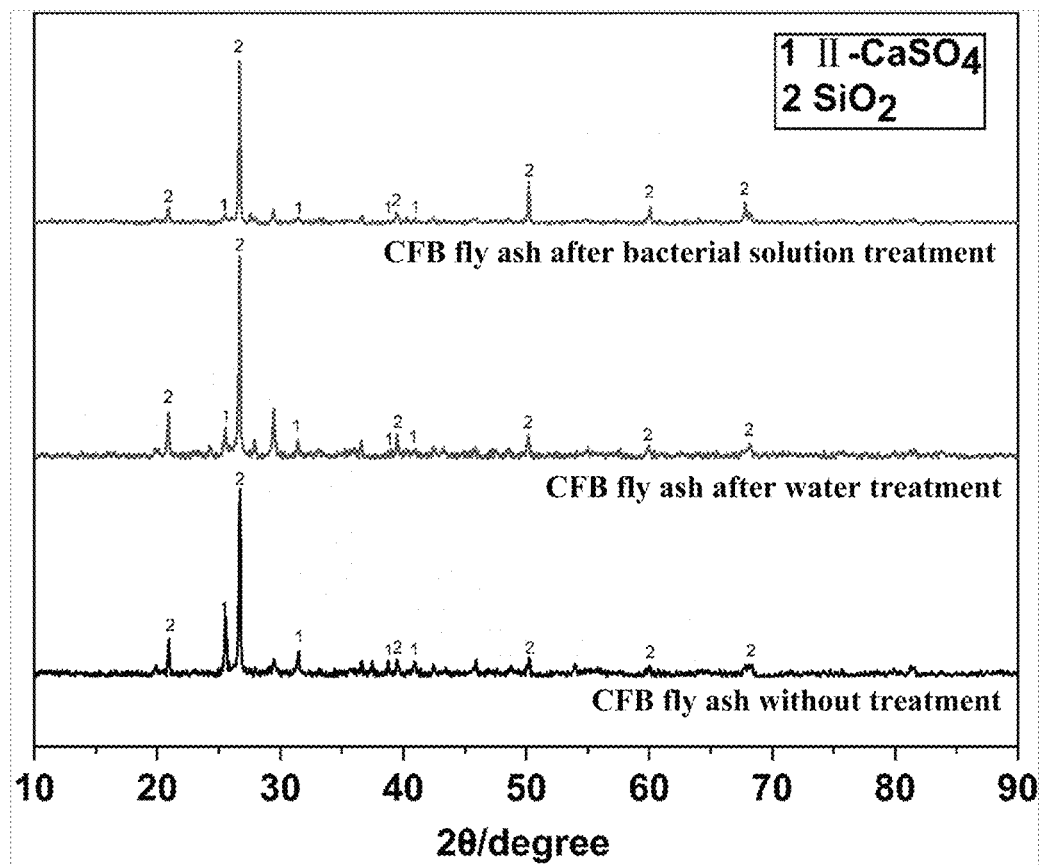
FIG. 3 shows X-ray diffraction (XRD) patterns of each treatment group of Example 7.

FIG. 3 shows XRD patterns of each treatment group, where the CFB fly ash after bacterial solution treatment is the microorganism-activated CFB fly ash cementitious material obtained in Example 1; and the CFB fly ash after water treatment is the CFB fly ash-based cementitious material obtained in Comparative Example 5. It can be seen from the results in FIG. 3 that the position of the diffraction peak of the CFB fly ash-based material does not change after being treated with the *Paenibacillus mucilaginosus* bacterial solution of the present disclosure, indicating that no crystal phase change is caused. However, the diffraction peak intensities of quartz ($SiO_2$) and anhydrite ($II\text{-}CaSO_4$) are reduced, and some diffraction peaks appear degeneration and broadening, indicating that after modification by the *Paenibacillus mucilaginosus* of the present disclosure, an ordered structure of quartz and anhydrite crystals in part of the CFB fly ash is destroyed, lattice defects are increased, and the reaction activity is improved.

Example 8

An influence of the treatment methods of Example 1, Comparative Example 5 and Comparative Example 6 was investigated on a dissolution rule of Si and Al in CFB fly ash, where a detection method of Si and Al was ICP-MS (with an Agilent 8900 Inductively Coupled Plasma Chromatograph). The test results were shown in Tables 3 to 4.

TABLE 3

Influence of each treatment group on Si dissolution (unit: mg/L)

| Time | Water | 2M NaOH | Example 1 |
|---|---|---|---|
| 0.5 d | 32.31 | 305.43 | 59.04 |
| 1 d | 56.28 | 613.23 | 112.35 |
| 2 d | 59.21 | 628.55 | 747.86 |
| 3 d | 61.33 | 635.18 | 944.61 |

As can be seen from Table 3, the maximum Si dissolution of CFB fly ash in the *Paenibacillus mucilaginosus* bacterial solution of Example 1 is greater than 2 M NaOH; in a strong alkali environment of 2 M NaOH, Si reaches the maximum dissolution at 1 d, and then remains basically unchanged; and under an environment of *Paenibacillus mucilaginosus* in Example 1, the dissolution of Si gradually increases and reaches the maximum at 3 d.

TABLE 4

Influence of each treatment group on Al dissolution (unit: mg/L)

| Time | Water | 2M NaOH | Example 1 |
|---|---|---|---|
| 0.5 d | 21.35 | 305.66 | 61.16 |
| 1 d | 35.23 | 592.03 | 83.85 |
| 2 d | 36.23 | 602.86 | 87.14 |
| 3 d | 39.51 | 608.14 | 119.84 |

As can be seen from Table 4, the Al dissolution of CFB fly ash in the *Paenibacillus mucilaginosus* bacterial solution of Example 1 is slightly higher than the dissolution in water, and is far lower than the dissolution in 2 M NaOH.

In summary, after the activation of *Paenibacillus mucilaginosus* bacterial solution of the present disclosure, a surface structure and an internal crystal structure of CFB fly ash particles are eroded, broken bonds are increased, and $SiO_2$ is easier to dissolve out, such that a total dissolving-out amount is improved to increase the reactivity.

It can be seen from the results of the above examples that the *Paenibacillus mucilaginosus* LT1906 is used to modify the CFB fly ash, which effectively ameliorates the large water demand and the low early strength of the CFB fly ash as a cementitious material. In addition, the preparation method of the microorganism-activated CFB fly ash-based cementitious material has a simple process, low energy consumption, and no secondary pollution, thereby improving comprehensive utilization of the CFB fly ash in the field of building materials.

Although the above embodiments have described the present disclosure in a thorough manner, it is only some but not all embodiments of the present disclosure, and other embodiments may be obtained without inventive step according to the present embodiments, all of which fall within the scope of protection the present disclosure.

What is claimed is:

1. A microorganism-activated circulating fluidized bed (CFB) fly ash-based cementitious material, comprising the following raw materials: CFB fly ash, a bacterial solution of the *Paenibacillus mucilaginosus* LT1906 with a deposit number of China General Microbial Culture Collection Center (CGMCC) No. 21337, and a vinegar residue leachate.

2. The microorganism-activated CFB fly ash-based cementitious material according to claim 1, wherein the CFB fly ash, the bacterial solution of the *Paenibacillus mucilaginosus* LT1906 and the vinegar residue leachate have a mass ratio of 100:9-27:18-36.

3. The microorganism-activated CFB fly ash-based cementitious material according to claim 1, wherein the CFB fly ash is a solid waste generated by burning coal in a CFB boiler, comprises the following components in mass percentages: $SiO_2 \geq 35\%$, $f\text{-}CaO \leq 4\%$, and $SO_3 \leq 3\%$, and has a specific surface area of 330 $m^2$/kg to 400 $m^2$/kg and a 80 µm sieve residue of 15% to 20%.

4. The microorganism-activated CFB fly ash-based cementitious material according to claim 1, wherein the bacterial solution of the *Paenibacillus mucilaginosus* LT1906 has a cell concentration of $10^6$ cells/mL to $10^7$ cells/mL and a viscosity of 2 mPa·s to 15 mPa·s.

5. The microorganism-activated CFB fly ash-based cementitious material according to claim 1, wherein a preparation method of the vinegar residue leachate comprises the following steps: mixing water with a fresh vinegar residue in a mass ratio of 800-1000:1, allowing to stand at 4° C. to 10° C. for 24 h to 36 h, and removing a solid vinegar residue by filtration to obtain the vinegar residue leachate.

* * * * *